United States Patent
Redmond et al.

(10) Patent No.: US 9,008,870 B2
(45) Date of Patent: Apr. 14, 2015

(54) DISPLAY FOR TERRAIN AVOIDANCE

(75) Inventors: James Peter Redmond, Glendale, AZ (US); Richard Darrell Ridenour, Glendale, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 0 days.

(21) Appl. No.: 10/389,492

(22) Filed: Mar. 14, 2003

(65) Prior Publication Data

US 2004/0181318 A1    Sep. 16, 2004

(51) Int. Cl.
| | | |
|---|---|---|
| G08G 1/16 | (2006.01) | |
| G06F 17/10 | (2006.01) | |
| G01C 5/00 | (2006.01) | |
| G05D 1/06 | (2006.01) | |
| G08G 5/00 | (2006.01) | |
| G08G 5/04 | (2006.01) | |

(52) U.S. Cl.
CPC .............. G08G 5/045 (2013.01); G01C 5/005 (2013.01); G05D 1/0646 (2013.01); G08G 5/0086 (2013.01)

(58) Field of Classification Search
USPC .............. 701/1, 3, 4, 7, 15, 16, 18, 120, 8–9, 701/301, 117, 200, 14, 213; 244/164, 171, 244/75, 180, 181, 186; 342/32, 455, 29–30; 340/961, 970, 963, 945, 947, 967, 340/977–978, 436; 707/920
See application file for complete search history.

(56) References Cited

U.S. PATENT DOCUMENTS

| | | | | |
|---|---|---|---|---|
| 4,020,324 A | * | 4/1977 | Buscher et al. ............... | 235/400 |
| 4,303,978 A | * | 12/1981 | Shaw et al. ................... | 701/506 |
| 4,372,507 A | * | 2/1983 | Denniston .................... | 244/113 |
| 4,546,354 A | * | 10/1985 | Boles ........................... | 342/179 |
| 4,825,375 A | * | 4/1989 | Nadkarni et al. ................. | 701/3 |
| RE33,152 E | * | 1/1990 | Atlas .......................... | 342/26 R |
| 5,057,833 A | * | 10/1991 | Carlson ........................ | 340/961 |
| 5,220,322 A | | 6/1993 | Bateman et al. | |
| 5,311,183 A | * | 5/1994 | Mathews et al. ............ | 342/26 B |
| 5,566,074 A | * | 10/1996 | Hammer ....................... | 701/301 |
| 5,706,011 A | | 1/1998 | Huss et al. | |

(Continued)

FOREIGN PATENT DOCUMENTS

| | | |
|---|---|---|
| EP | 0 396 071 | 7/1990 |
| EP | 0 750 238 A1 | 12/1996 |

(Continued)

OTHER PUBLICATIONS

Runway incursion prevention using an advanced surface movement guidance and control system (A-SMGCS); Young, S.D.; Jones, D.R.; Digital Avionics Systems Conference, 2000. Proceedings. DASC. The 19th; vol. 1; DOI: 10.1109/DASC.2000.886913; Publication Year: 2000 , pp. 2E2/1-2E2/8 vol. 1.*

(Continued)

Primary Examiner — Cuong H Nguyen
(74) Attorney, Agent, or Firm — Allen J. Moss; Squire Patton Boggs (US) LLP (57) ABSTRACT

A terrain warning system includes an indicator to inform a pilot of a proposed degree of flight parameters for safely clearing terrain. An aural message may identify a vertical speed that may be used to safely traverse terrain to the pilot. A visual indicator on a display informs the pilot of a vertical speed or climb angle to traverse terrain. The display may be a vertical speed indicator also capable of displaying traffic advisories.

27 Claims, 6 Drawing Sheets

(56) References Cited

U.S. PATENT DOCUMENTS

| | | | |
|---|---|---|---|
| 6,021,374 A | 2/2000 | Wood | |
| 6,088,654 A * | 7/2000 | Lepere et al. | 701/301 |
| 6,130,705 A * | 10/2000 | Lareau et al. | 348/144 |
| 6,150,960 A | 11/2000 | Voulgaris et al. | |
| 6,154,151 A * | 11/2000 | McElreath et al. | 340/970 |
| 6,433,729 B1 * | 8/2002 | Staggs | 342/29 |
| 6,445,310 B1 * | 9/2002 | Bateman et al. | 340/970 |
| 6,480,120 B1 * | 11/2002 | Meunier | 340/970 |
| 6,538,581 B2 * | 3/2003 | Cowie | 340/961 |
| 6,646,588 B2 * | 11/2003 | Tran | 342/29 |
| 6,885,917 B2 * | 4/2005 | Osder et al. | 701/3 |
| 6,922,703 B1 * | 7/2005 | Snyder et al. | 345/633 |
| 2002/0089432 A1 | 7/2002 | Staggs et al. | |
| 2002/0089433 A1 * | 7/2002 | Bateman et al. | 340/970 |
| 2004/0093130 A1 * | 5/2004 | Osder et al. | 701/3 |

FOREIGN PATENT DOCUMENTS

| | | |
|---|---|---|
| EP | 0 965 118 | 12/1999 |
| EP | 0 987 562 A1 | 3/2000 |
| WO | WO 92/21077 | 11/1992 |
| WO | WO 00/31564 | 6/2000 |

OTHER PUBLICATIONS

Near-optimal terrain collision avoidance trajectories using elevation maps; Malaek, S.M.; Abbasi, A.; Aerospace Conference, 2006 IEEE; DOI: 10.1109/AERO.2006.1656012; Publication Year: 2006.*

Synthetic vision for enhancing poor visibility flight operations; Moller, H.; Sachs, G.; Aerospace and Electronic Systems Magazine, IEEE; vol. 9, Issue: 3; DOI: 10.1109/62.275379; Publication Year: 1994, pp. 27-33.*

Separation of air traffic by visual means: An estimate of the effectiveness of the see-and-avoid doctrine; Graham, W.; Orr, R.H. Proceedings of the IEEE; vol. 58, Issue: 3; DOI: 10.1109/PROC.1970.7639; Publication Year: 1970, pp. 337-361.*

Technical Standard Order (TSO-C151a) "Terrain Awareness and Warning System" Nov. 29, 1999 (pp. 1-39), Dept. of Transportation, Washington D.C.

RTCA DO-161A, "Minimum Performance Standards—Airborne Ground Proximity Warning Equipment," May 27, 1976 (pp. 1-54).

* cited by examiner

VERTICAL SPEED INDICATOR/TRAFFIC
RESOLUTION ADVISORY DISPLAY (VSI/TRA)

Fig. 6

DISPLAY FOR TERRAIN AVOIDANCE

BACKGROUND OF THE INVENTION

1. Technical Field

The present invention generally relates to methods and systems for reducing the risk of collisions between aircraft and terrain. Such systems and methods inform a pilot of a degree of change in flight to avoid colliding with terrain.

2. Background Art

Ground Proximity Warning Systems (GPWS), Ground Collision Avoidance Systems (GCAS), and/or Terrain Awareness and Warning Systems (TAWS), are used in aircraft to inform pilots or other flight crew members of a likely or imminent collision with terrain. For simplicity, these systems are collectively and generically referred to herein as TAWS. TSO-C151a (Technical Standard Order) and RTCA DO-161A, incorporated herein by reference, including Appendices, prescribe minimum operational performance standards for TAWS equipment.

TAWS includes a Forward Looking Terrain Avoidance (FLTA) function which looks ahead of an aircraft along and below the aircraft's lateral and vertical flight path and provides alerts to a flight crew if a potential Controlled Flight Into Terrain (CFIT) threat exists. CFIT is an aircraft accident where a completely airworthy aircraft is flown into terrain (which may include man-made obstacles) or water. In the United States, Class A TAWS equipment is required to provide terrain information on a display, such as a weather radar indicator, or other video output device. In display, such as a weather radar indicator, or other video output device. In such a system, visual and aural signals are provided to a flight crew for both caution and warning alerts in one or more of the following situations:

(1) excessive rate of descent
(2) excessive closure rate to terrain;
(3) negative climb rates/loss of altitude after take-off;
(4) unsafe clearance when not in landing configuration;
(5) excessive downward deviation from an ILS (Instrument Landing System) glideslope;
(6) CFIT threats; and
(7) when an aircraft is hazardously below the normal (typically three degree) approach path for the nearest runway.

A "caution alert" as used herein is provided when a potentially hazardous flight condition with terrain is detected, immediate crew/pilot attention is warranted, and a potential for crew/pilot action exists. In a TAWS, a typical caution alert is in the form of an audible notification of a flight condition, e.g., "terrain ahead" and includes corresponding visual indicators of the flight condition such as an amber or yellow light on a display. A "warning alert" as used herein is provided by a TAWS when a potentially hazardous flight condition with terrain is detected and immediate crew/pilot action is required to avoid the hazardous flight condition.

Typically, a warning alert may be in the form of an audible instruction to take action (e.g., "terrain, terrain; pull up, pull up") and corresponding visual indicator (e.g., a red light or symbol on a cockpit display) notifying a crew or pilot that action is required to avoid an imminent threat. In most instances a warning alert is only provided after a caution alert is provided. The differences between these alert types are made primarily to distinguish between severities of terrain threats encountered during flight.

Forward Looking Terrain Avoidance (FLTA) uses a "look ahead" or "sensor" profile to determine whether to generate caution and/or warning alerts. The sensor profile is a three dimensional mathematical model of potential future aircraft position and is compared with terrain data to determine whether a potential for collision with terrain exists. If terrain data intersects or conflicts with the sensor profile then a caution alert or warning alert is given to the flight crew. The differences between a caution alert and a warning alert are generally related to the proximity in time or distance of the terrain to the aircraft. For example, a sensor profile for a caution alert may extend further in time or distance from the aircraft position than the sensor profile used for generating a warning alert.

Figure 1:
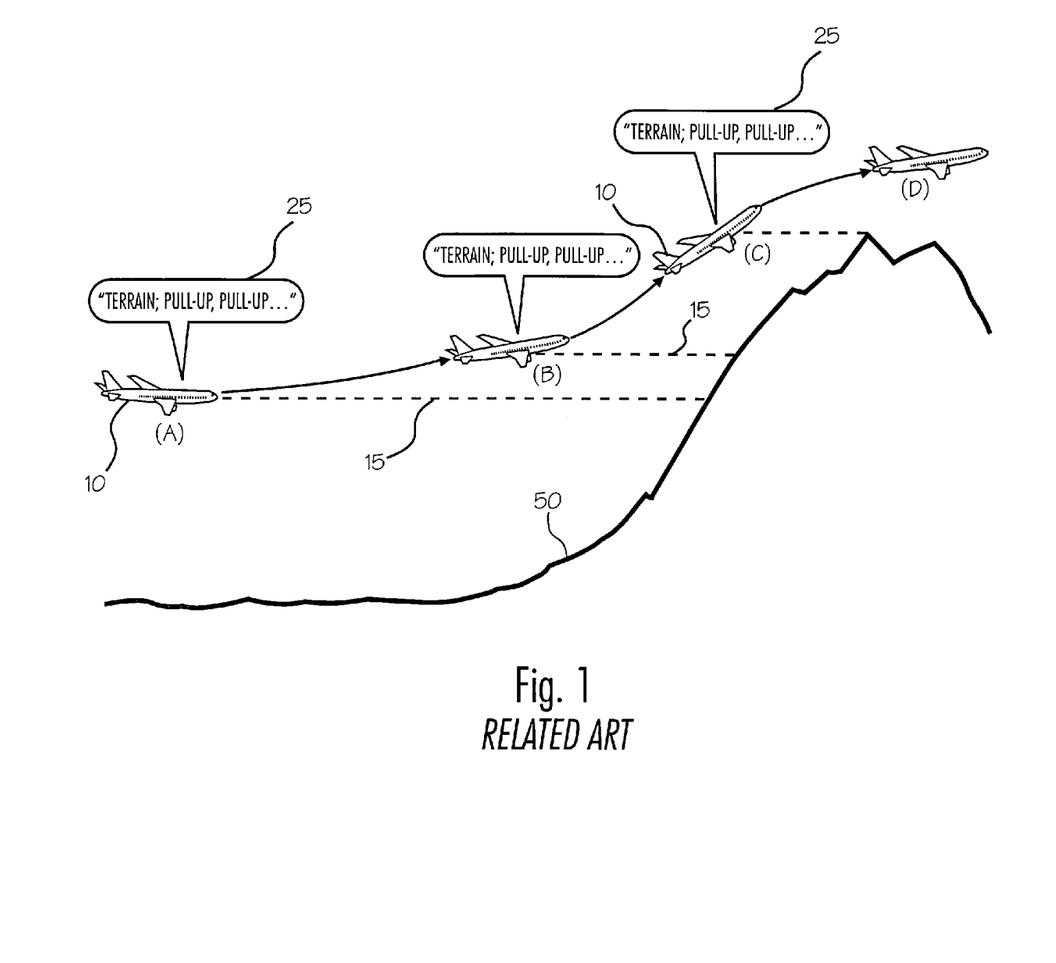
FIG. 1 is an action sequence diagram of a Terrain Awareness and Warning System (TAWS) and method of the related art.

Referring now to FIG. 1, an example of conventional TAWS functionality will be described. The FLTA function of the TAWS in aircraft 10 compares the sensor profile 15 (also referred to herein as "terrain avoidance profile") with numerical models of terrain features, for example mountain 50, stored in a database. For the sake of simplicity, the FLTA described herein relates to terrain avoidance profiles 15 used in association with generating a warning alert. However, profile 15, as well as other types of profiles discussed herein may be used for generating either a caution alert or a warning alert.

When profile 15 for aircraft 10 at position (A) encounters terrain feature 50 (i.e., the model of flight position intersects the model of terrain), the TAWS in aircraft 10 issues a warning alert including aural alert 25 such as "terrain; pull up, pull up." The pilot of aircraft 10 reacts to the warning alert by enacting a terrain avoidance maneuver, for example, changing the flight path for increasing elevation of aircraft 10 through positions (B) and (C) until profile 15 no longer encounters with terrain feature 50. At this point (shown at position (D)), aural alert 25 ceases and the pilot may stop increasing the elevation of aircraft 10 to overcome terrain feature 50.

This conventional TAWS suffers from several problems. By way of example, when visual inspection by a pilot is impossible or retarded (e.g., fog, darkness, or other visually impairing condition), a pilot may be entirely surprised by a terrain warning alert. Since conventional terrain alerts do not articulate any details about the collision threat, the pilot may enact a rigorous increase in elevation to avoid the threat of collision with terrain. Moreover, in many conventional TAWS the warning alert is continuously repeated until aircraft 10 reaches an elevation high enough to overcome terrain 50. In this case, the pilot may continue the most rigorous increase in elevation possible until the terrain threat is overcome. Severe flight path alterations, such as attempting or continuing rigorous increases in climb angle, may: (i) induce aircraft 10 to stall (which actually increases the chance of collision with the terrain); (ii) lead to injury of passengers and/or flight crew; (iii) damage cargo and/or the aircraft; (iv) cause unnecessary stress on the pilot and/or flight crew; and/or (v) result in an uncomfortable ride.

With the conventional terrain warning methods and systems, a pilot may unnecessarily enact extreme terrain avoidance maneuvers and may not realize that danger has subsided until the aural alert ceases, even though in reality, a timely response by the pilot and a slight or gradual increase in altitude might avoid the terrain.

BRIEF SUMMARY OF THE INVENTION

The methods and systems of the present invention alleviate one or more of the aforementioned problems. A method for avoiding a collision with terrain according to one embodiment of the invention includes: (i) informing a pilot of a potential for collision with terrain; and (ii) indicating to the pilot a specific degree of change in the flight path that may be used to overcome a terrain threat.

A system for avoiding collisions with terrain according to one embodiment includes means for comparing a terrain avoidance profile with terrain information, and means for indicating to the pilot a specific amount of change in the current flight path that may be used to avoid terrain threats.

Further methods and systems of the present invention include indicating to the pilot, and means for indicating, specific terrain avoiding flight parameters sufficient to overcome a potential collision with terrain.

Further methods and systems of the present invention include indicating to the pilot a degree of change in at least one flight parameter necessary to avoid collision with terrain, wherein the at least one flight parameter relates to one or more of the vertical speed, flight path angle, ground speed, and bearing.

Another aspect of the invention includes displaying terrain avoidance information on a vertical speed indicator.

BRIEF DESCRIPTION OF THE DRAWING

Additional advantages, features and aspects of the present invention will become apparent from the following description of the drawing in which like numerals denote like elements and in which.

DETAILED DESCRIPTION OF THE INVENTION

A terrain warning system of the present invention may be operated from any vehicle passing over terrain (e.g., an aircraft, space craft, or submarine). A terrain warning system according to various aspects of the present invention includes any system that describes a non-maximum maneuver to avoid terrain with safety and comfort.

Figure 2:
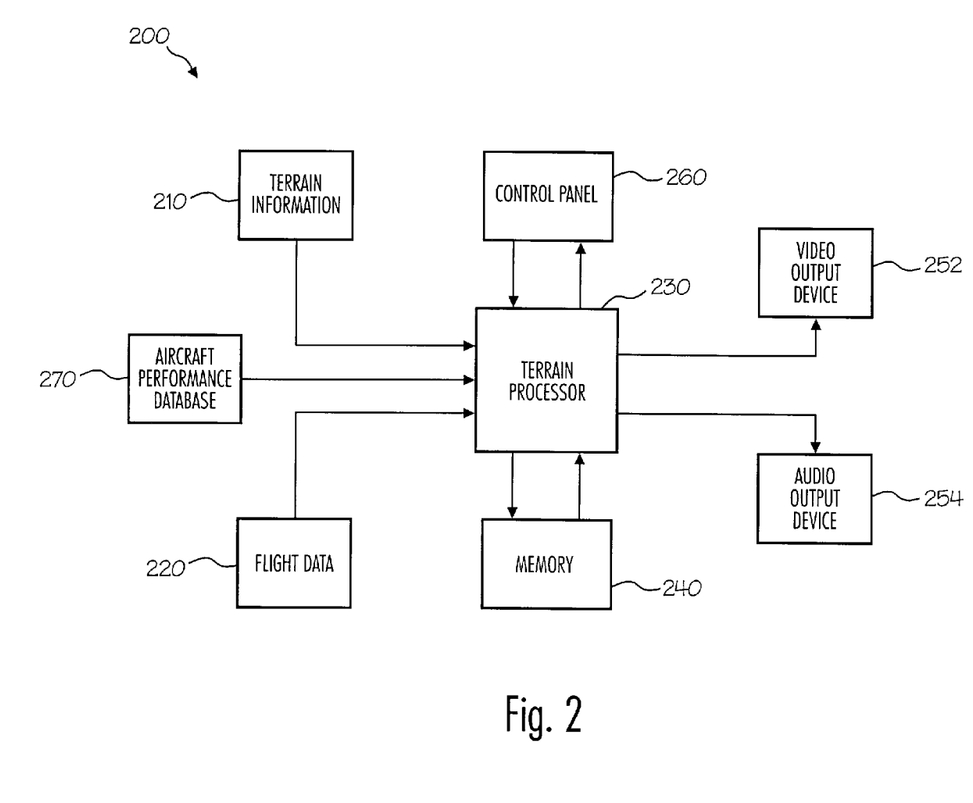
FIG. 2 is a block diagram of an aircraft terrain warning system according to a first embodiment of the present invention.

Turning to FIG. 2, a block diagram of a system, for example system 200, for reducing the risk of a collision between an aircraft and terrain according to certain aspects of the invention will now be described. System 200 preferably includes terrain information source 210, flight data source 220, processor 230, memory 240, and at least one output device 252 and 254.

System 200 compares one or more sensor profiles with terrain information and generates alerts when conflicts between the sensor profile(s) and terrain information exist. Any conventional sensor profile may be used for system 200. Terrain alerts are generated by processor 230 based on terrain information (e.g., topographical models of terrain from source 210), current flight data (e.g., ground speed, vertical speed, altitude, and/or bearing from source 220), and aircraft specific information (e.g., equations, variables and/or constants stored in optional database 270) according to instructions stored in a memory (e.g., memory 240).

System 200 calculates and outputs one or more terrain avoidance parameters (e.g., to output devices 252, 254) to assist the pilot in executing a non-maximum terrain avoidance maneuver sufficient to overcome any threat of collision with terrain. As used herein, a "terrain avoidance parameter" means a specific value (or range of values) identified for adjusting a related current flight parameter to avoid a collision with terrain.

In preferred embodiments, system 200 calculates and outputs a terrain avoidance parameter comprising indicia of a vertical speed (or range of vertical speeds) that may be used to reduce a collision threat with terrain. For example, system 200 alerts a pilot of the potential for collision with terrain and identifies a terrain-avoiding vertical speed (or range of vertical speeds) on output device 252 and/or 254 that would be sufficient to elevate the aircraft above the terrain in sufficient time before the aircraft reaches the terrain.

In other embodiments, terrain avoidance parameters calculated and output by system 200 may include a climb angle, a bearing, a bank angle, a thrust, a combination of these parameters, or other suggested flight parameters that, if enacted by the pilot, would be sufficient to reduce the threat of collision with terrain which caused an alert to be generated.

Terrain avoidance parameters generally alert the pilot of at least on non-maximum maneuver. Such an alert may be relative to a current flight parameter (e.g., to increase bearing to port by ten degrees) or an absolute value (e.g., set thrust to 80% of maximum). A combination of absolute and relative terrain avoidance parameters may be used.

Optionally, system 200 may also include a control unit 260 for controlling settings of system 200 such as sensitivity, display, volume, type of terrain avoidance parameter to be output and/or other settings.

Terrain information source 210 provides information to processor 230 regarding coordinates and altitudes of naturally occurring and man-made obstacles, or water, collectively referred to herein as "terrain." Terrain information source 210 may be any single device or combination of devices for accomplishing this purpose including, for example, a memory storing a database comprising a precompiled model of terrain, active radar providing information for terrain modeling, a receiver obtaining information regarding surrounding terrain over a wireless communications link such as a transponder or the like, or any combination of these devices.

Flight data source 220 provides to processing device 230, information regarding current flight information including, for example, altitude, bearing, ground speed, and vertical speed. This information is used for a terrain avoidance profile and for calculating terrain avoidance parameters. Flight data source 220 may be any single device or combination of devices capable of serving this purpose including, for example, one or more altimeters, a global positioning receiver, a gyroscope, air data computer, a traffic collision and avoidance system (TCAS), an inertial reference system, a flight management system, and/or an altitude heading reference system.

An optional Aircraft Performance Database (APD) 270 provides aircraft-specific information to processor 230 for determining and/or adjusting terrain avoidance profiles based on static or dynamic characteristics of the aircraft. For example, APD 270 may include a table of values retrievable by processor 230 for determining a suitable sensor profile to be used for the aircraft. These values may differ according to current aircraft conditions including air temperature, weight, historical performance data, and other information. ADP 270 may be any database or information storage system for accomplishing these purposes and may be stored in any fixed or portable memory device or shared memory device accessible by processor 230.

Processor 230 performs a method for reducing a threat of collision with terrain. For example, processor 230 continuously determines the one or more sensor profiles (if the sensor profiles are not fixed values) and compares the sensor profile(s) with terrain data to determine whether a terrain threat exists. Processor 230 uses information from sources 210 and 220 (and if provided, APD 270) to determine if a threat of collision with terrain exists. Processor 230 provides one or more signals to output information to output devices 252, 254 for informing a pilot of terrain threats and suggest changes in flight parameters. Any single processing circuit or combination of processors may be used for this purpose, including, for example, a microprocessor, micro-controller, programmable logic array or combination thereof.

Memory 240 stores machine-readable code read by processor 230. Memory 240 may function as a Random Access Memory, Read Only Memory, storage buffer or other conventional circuit for storing data (e.g., control settings, temporary information, constants, equations or other information necessary for processing the information and generating output information as described herein). Memory 240 may be a single device or combination of devices for accomplishing this purpose and may be integrated or partially integrated with processor 230 (e.g., formed on a substrate). Memory 240 may further comprise a fixed memory or portable memory and may serve as the database memory for terrain information source 210 (e.g., a terrain database stored in a physical memory device) and/or memory for APD 270.

Output devices 252 and 254 serve the purpose of providing to a pilot, information about terrain, and avoiding the same, to a pilot. Output devices 252, 254 convert electrical signals generated by processor 230 and/or other devices into visible indicia and/or audible sound. Any single device or combination of devices that accomplish this function may be used, for example, a transducer, an analog display, a digital display, an L.E.D., and/or a laser. In a preferred embodiment, one or more analog speakers 254 is used for outputting aural indicia and a display device 252 such as a cockpit display, weather display, vertical speed indicator or other electronic flight instrument system (EFIS) display is used to output a presentation including visual indicia.

System 200 may be an integrated device, discreet components of a shared system, or other type of processing configuration able to perform the functions described herein.

A method displaying terrain according to the present invention may be performed in any vehicle passing over terrain. The terrain warning methods according to various aspects of the present invention include methods that describe to a pilot or flight crew specific instructions, which include a non-maximum maneuver, to safely and comfortably avoid terrain.

Figure 3:
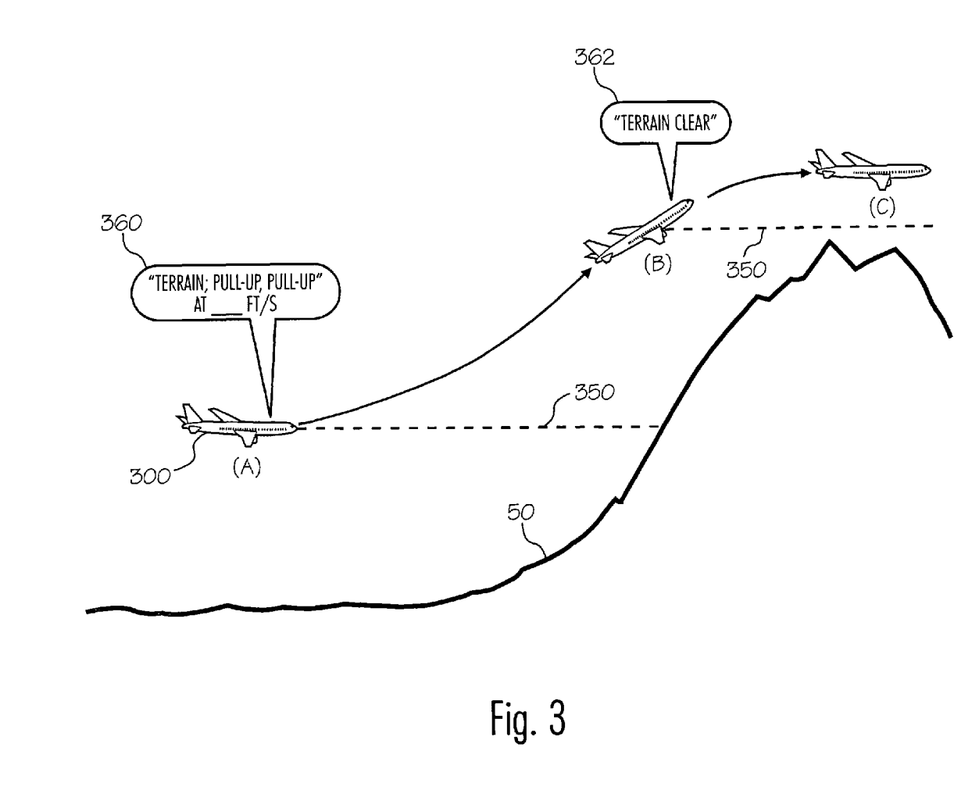
FIG. 3 is an action sequence diagram for an aircraft having a terrain warning system of the present invention.
Figure 4:
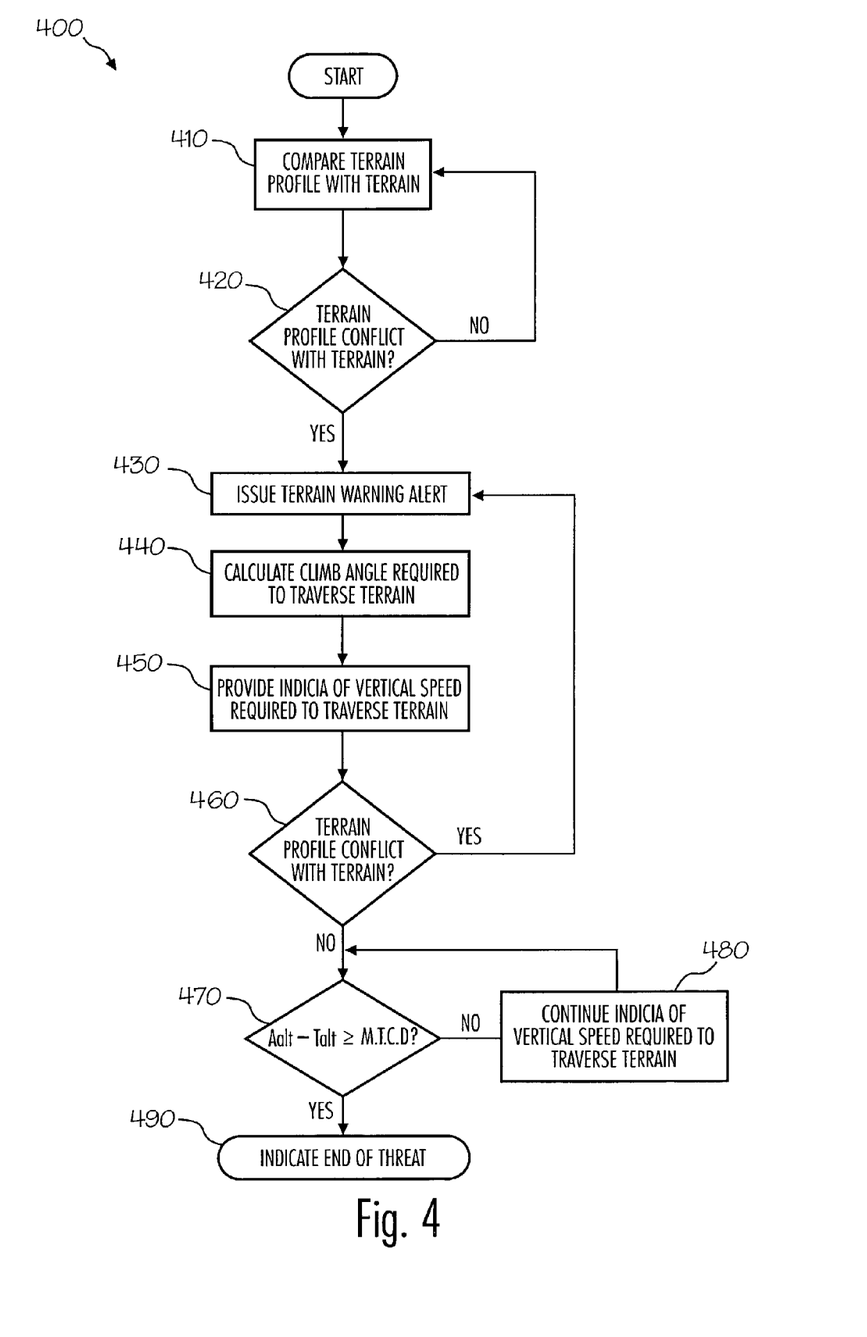
FIG. 4 is a process flow diagram of a method of operation of a terrain warning system according to the present invention.

Turning to FIGS. 3 and 4, a method (e.g., method 400; FIG. 4) for operation of a terrain avoidance system (e.g., system 200; FIG. 2) will now be described with reference to an exemplary action sequence (FIG. 3). In an aircraft (e.g., aircraft 300) equipped with a terrain warning system having a Forward Looking Terrain Avoidance (FTLA) function, the terrain warning system continuously compares (410; FIG. 4) a terrain avoidance profile (or sensor profile) 350 with available terrain information to determine whether a potential CFIT threat exists. If terrain avoidance profile 350 encounters the terrain, a terrain alert (caution or warning alert) is issued to the pilot. Accordingly, method 400 (FIG. 4) includes comparing 410 the sensor profile with terrain, determining 420 whether the profile conflicts with terrain, and if so, issuing 430 a terrain alert (warning alert or caution alert) to the pilot of the aircraft.

For example, as illustrated by the scenario in FIG. 3, when aircraft 300 is at position (A), terrain avoidance profile 350 encounters terrain 50 and the terrain warning system in aircraft 300 issues an aural alert and/or visual alert (e.g., message 360) to the pilot. The terrain warning system in aircraft 300 determines (e.g., 440; FIG. 4) a climb angle that may, if enacted by the aircraft, avoid or reduce the risk of collision with terrain 50.

The system indicates (450; FIG. 4) one or more flight parameters for the pilot to enact in order for the aircraft to obtain the calculated climb angle and traverse terrain 50 (e.g., a vertical speed is suggested to the pilot which will enable the aircraft to obtain the calculated climb angle and overcome terrain 50). Calculation of climb angles and/or vertical speeds may be performed utilizing conventional aeronautical equations and are thus not described in any detail herein.

The terrain warning system in aircraft 300 continuously determines (460; FIG. 4) whether the sensor profile 350 continues to conflict with terrain 50. If a conflict continues, the system may continue to issue (430: FIG. 4) terrain alerts, recalculate 440 the climb angle(s) and/or vertical speed (or other flight parameters) which may be used to traverse the terrain, and adjust the pilot's indication 450 of terrain avoidance parameters to enable the pilot of to avoid the terrain.

By way of contrast, conventional TAWS do not provide any indication of the degree or range of flight parameters that may be enacted by a pilot to prevent (or reduce the risk of) colliding with terrain. The pilot using conventional TAWS responds to a generalized aural and visual warning alert by enacting a maximum maneuver since conventional TAWS does not provide any relative or absolute value for a flight parameter which may be enacted to safely and comfortably overcome the threat of collision with terrain. Moreover, in conventional TAWS, the duration of a maximum maneuver is unknown to the pilot whereas according to various aspects of the present invention, the non-maximum flight parameters for traversing terrain may be continuously indicated to the pilot.

In certain preferred aspects of the present invention, the terrain avoidance flight parameters include one or more pull-up are indicators (aural and/or visual) (e.g., message 360) and a specific vertical speed (or range thereof) for which the aircraft could enact to reduce the chances of a collision with terrain 50. Additionally, or in the alternative, the pull-up indicators may indicate the vertical speed or range thereof that is insufficient to overcome the terrain threat.

In this manner, a pilot may realize the significance of a terrain threat by understanding a range of vertical speeds that may be used to traverse the terrain threat. A predetermined minimum vertical speed, or other terrain avoidance flight parameter, gives rise to an alert condition consistent with both safety and comfort parameters. A predetermined maximum vertical speed or other terrain avoidance flight parameter is the bottom limit for a safe, but not necessarily comfortable, terrain avoidance maneuver and may be used as a threshold for an "avoid terrain alert." The "avoid terrain alert" is issued when a TAWS determines that the aircraft is incapable of obtaining climb angle or vertical speed necessary to traverse the elevation of a terrain threat.

A pilot may select the desired comfort of a terrain avoidance maneuver by determining at what point he or she is willing to enact a terrain avoidance maneuver. For example, a pilot may not decide to enact a terrain avoidance maneuver when the suggested flight parameter indicates that a minimum vertical speed of +100 ft/s (30.5 m/s) should be used to traverse terrain, but rather the pilot may prefer to wait to enact a terrain avoidance maneuver until the suggested flight parameter indicates that a vertical speed of +500 ft/s (152.4 m/s) should be used to overcome the terrain threat.

In certain embodiments, a minimum terrain avoiding climb angle, vertical speed or other flight parameter (or range thereof which gives rise to an alert may be set or preset by the pilot, manufacturer, or aircraft owner. The maximum terrain avoiding flight parameters may also be set or preset.

The one or more indicators of flight parameters for terrain avoidance may be provided either subsequently to, or concurrently with, an issued caution or warning alert. As shown by the example scenario in FIG. 3, message 360 comprises indicia to inform the pilot of the terrain threat and indicia of a vertical speed that may be used to safely traverse the terrain threat.

When sensor profile 350 no longer conflicts with terrain 50, preferably the terrain warning alert is no longer issued. However, whether the terrain has actually been traversed depends on the type and shape of the sensor profile used in the terrain warning system of aircraft 300.

For example, in an implementation using a terrain avoidance profile that extends horizontally in front of the aircraft a certain distance and remains substantially parallel to the horizon regardless of the climb angle of the aircraft, the terrain alert may continue to issue until the aircraft actually surpasses an altitude of the terrain that caused the terrain alert (470, 490; FIG. 4) even though in actuality, an eminent collision with the terrain was already averted (e.g., the aircraft pulled up to climb along a slope of the terrain).

In another implementation using a terrain avoidance profile that extends from the nose of the aircraft a certain distance in the direction of the aircraft climb angle, when a pull-up maneuver is enacted, the terrain avoidance profile may no longer conflict with the terrain because, for example, the aircraft is parallel to the slope of the terrain. In a system using this type of terrain avoidance profile, the terrain alert often ceases or is subdued during a terrain avoidance maneuver since the potential collision is no longer imminent. Notwithstanding, it still may not be safe to resume the previous flight path angle (i.e., flight path angle of aircraft when the terrain alert issued) since the aircraft may be parallel or near parallel to the slope of the terrain. Accordingly, a continue climb indicator and an end threat indicator (e.g., message 362; FIG. 3) may be provided (480, 490; FIG. 4) depending whether the elevation of the aircraft ($A_{alt}$) is the same or greater than the elevation of the terrain threat ($T_{alt}$) plus preferably a Minimum Terrain Clearance Distance (M.T.C.D.) 470. That is depending on whether the aircraft is at an elevation sufficient to traverse the terrain threat. The M.T.C.D. is a desired safety level for aircraft clearance above terrain and may be a fixed value or selected from a set of values based on the current phase of aircraft flight. In one embodiment of the invention the M.T.C.D. is a fixed value of five hundred feet above ground level (A.G.L.) and may be set to another value when, for example, the aircraft is in landing configuration.

In a system using a sensor profile aligned with the direction of the aircraft flight path angle, after a terrain avoidance maneuver has been initiated and the conflict between the terrain avoidance profile and terrain ceases, the terrain warning alert may be switched off by the system or modified to reflect caution status while the system continues to notify the pilot of a certain vertical speed to be maintained 480 until the terrain is traversed (or until the end threat indicator (e.g. 362; FIG. 3) is provided 490).

Providing 450 indicia to the pilot suggesting a vertical speed to traverse the terrain may be performed using any suitable aural and/or visual indicator including audible messages and/or visual indicators. In one embodiment of the invention an audible indicator is provided to the pilot (e.g., climb at 700 feet per second). In other embodiments of the invention, as discussed in more detail below with reference to FIG. 6, visual indicia of vertical speed or a range of vertical speeds is displayed to the pilot for executing a terrain avoidance maneuver. Such visual indicia may be displayed and/or supplemented by providing corresponding indicators such as "fly to green" indicators commonly used on an aircraft's vertical speed indicator/display for Resolution Advisories generated by a Traffic Alert and Collision Warning System (TCAS).

In embodiments of the invention utilizing a terrain avoidance profile that varies with the aircraft climb angle; the terrain warning alert ceases once the aircraft has modified its flight path angle to resolve the conflict between the terrain avoidance profile and the terrain. During the terrain avoidance maneuver, a second sensor profile (referred to as a "terrain clear profile") may be used to determine when the maneuver should be ended (e.g., whether the aircraft altitude exceeds an altitude+M.T.C.D. of the terrain which initiated the terrain warning). This second sensor profile is referred to herein as a "Clear Terrain Profile" and is mathematically modeled to extend a certain distance in a direction of the aircraft track and substantially parallel to the horizon (regardless of the current aircraft climb angle).

During a terrain avoidance maneuver, the Clear Terrain Profile is continuously compared to the terrain model to determine whether the altitude of the aircraft exceeds that of the terrain threat (plus preferably an M.T.C.D.). During the terrain avoidance maneuver, a cautionary status may be communicated to the pilot by, for example, a visual alert such as an amber text message on a cockpit display and/or an aural alert indicating "continue climb" or other indicators to inform the pilot that he/she should continue the terrain avoidance maneuver. For example, the cautionary alert may indicate to the pilot that the present vertical speed should be maintained and/or not to fly below a specific vertical speed or climb angle.

When the Clear Terrain Profile ceases to conflict with terrain, an end of threat indicator (e.g., indicator 362; FIG. 3) may be provided 490. In one implementation, the absence of the indicia suggesting vertical speed for traversing the terrain threat indicates the end of threat. End of threat indicia are provided to inform the pilot that he/she may cease increasing the vertical speed of the aircraft or "level off."

Figure 5:
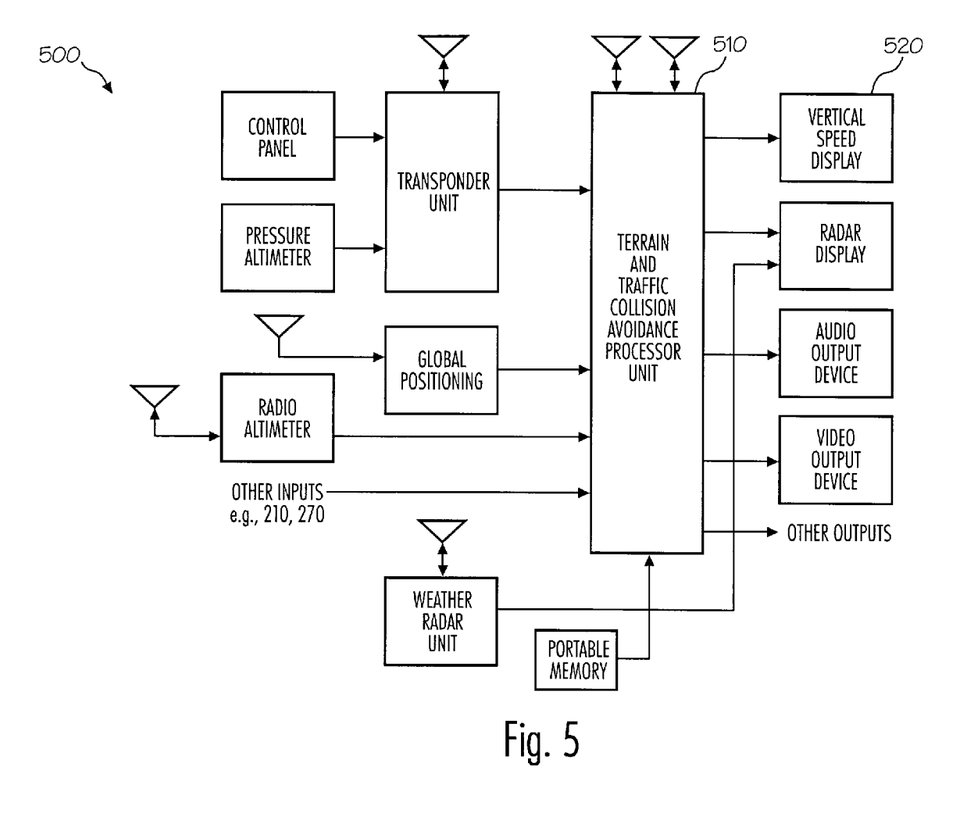
FIG. 5 is a functional block diagram of an aircraft terrain warning system according to a second embodiment of the invention.

A second embodiment for a system for providing terrain avoidance parameters according to the present invention will now be described with reference to FIG. 5.

System 500 is similar to system 200 described with reference to FIG. 2 but further includes equipment and software for the additional processing functionality of any air traffic alert and collision warning system, referred to herein as "TCAS."

System 500 includes an integrated processor 510 that performs terrain avoidance functions discussed above with reference to system 200 (FIG. 2) and further performs all conventional TCAS or ACAS functions including tracking surrounding air traffic and generating Traffic Alerts (TAs) and Resolution Advisories (RAs). Vertical speed indicator/traffic resolution advisory display (VSI/TRA) 520 displays TCAS advisories and terrain avoidance parameters (such as a recommended vertical speed or range of vertical speeds). For example, vertical speed indicator display 620, of FIG. 6, includes a suggested terrain avoidance climb indicator 650.

Figure 6:
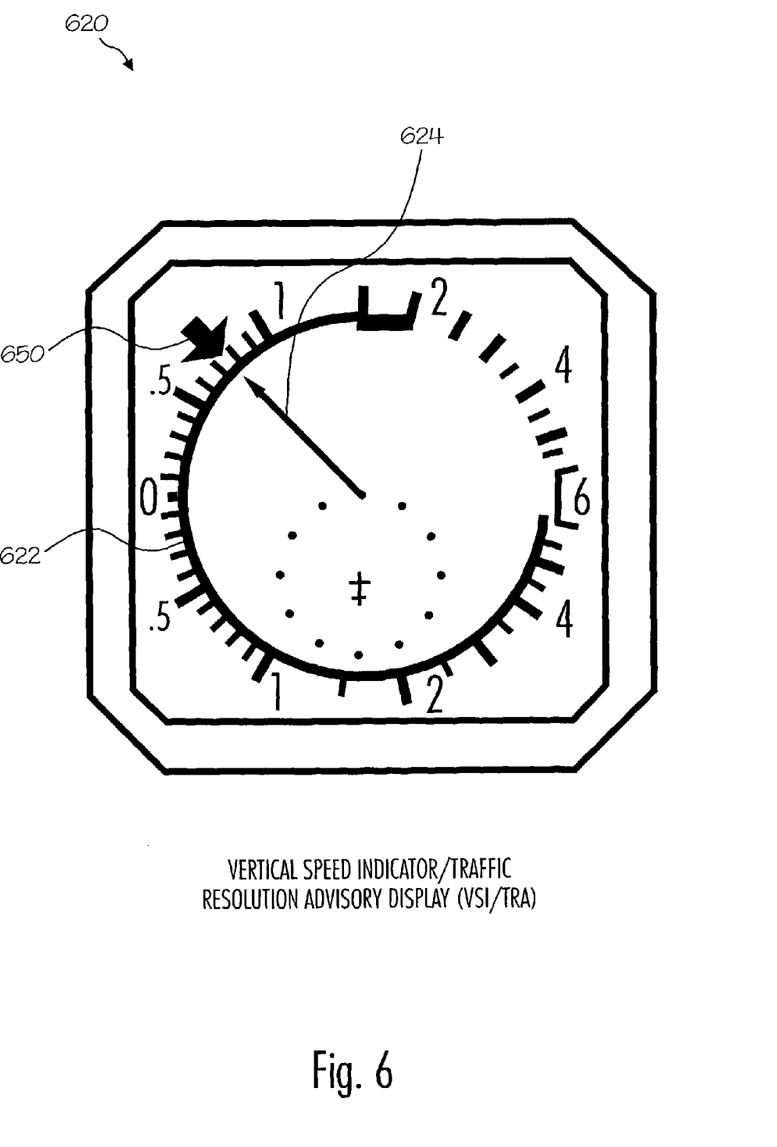
FIG. 6 is a plan view of a presentation for a pull up rate indicator for avoiding terrain according to various embodiments of the invention.

When a terrain alert is issued, indicator 650 appears on the aircraft's vertical speed indicator indicating a minimum or range of vertical speeds the pilot should attain to avoid the terrain threat (and/or the threshold vertical speed that is insufficient to overcome the terrain threat). The pilot may then enact a terrain avoidance maneuver using the recommended vertical speed represented by indicator 650. The pilot may control the aircraft to meet or exceed a vertical speed indicated by terrain avoidance climb indicator 650 by increasing the aircraft vertical speed so that need 624 (which represents the aircraft's current vertical speed) is aligned with or exceeds the vertical speed denoted by indicator 650.

In the example of FIG. 6, terrain avoidance climb indicator 650 shows that the terrain threat may be safely and comfortably traversed by attaining a vertical speed of +750 ft/s (228.6 m/s) as indicated on VSI/TRA scale 622. In alternate implementations the display of Resolution Advisories (RAs) or Traffic Advisories (TAs) may be omitted.

In one implementation indicator 650 is the standard "fly to green" and/or "avoid red" indictors provided on a VSI/TRA similar to that of a resolution advisory provided by conventional TCAS.

In other implementations, indicator 650 is represented using symbology including varying colors denoting the severity of a terrain threat. For example, indicator 650 may be yellow for terrain caution alerts or for a continue climb indicator and/or red for terrain warning alerts.

A significant feature of the present invention is the ability to inform a pilot of a terrain threat and provide information to the pilot describing how to avoid the terrain threat without enacting a terrain avoidance maneuver outside the range for comfortable flight. The methods and systems of the present invention preferably include an Alert Prioritization Scheme between TCAS and TAWS of the type described in TSO-C151a.

Unless contrary to physical possibility, the inventor envisions the methods and systems described herein: (i) may be performed in any sequence and/or combination; and (ii) the components of respective embodiments combined in any manner.

Accordingly, although there have been described preferred embodiments of this novel invention, many variations and modifications are possible and the invention described herein is not limited by the specific disclosure above, but rather should be limited only by the scope of the appended claims.

What is claimed is:

1. A method for reducing a risk of an aircraft colliding with terrain, the method comprising:
    comparing, with a processor, one or more terrain avoidance profiles with terrain information to determine with the processor whether a terrain threat exists; and
    after the terrain threat is determined to exist, communicating, with one or more of a video output device and an audio output device, first indicia to a pilot identifying that the terrain threat exists and communicating with one or more of the video output device and the audio output device second indicia to the pilot identifying a range of change in a flight parameter of the aircraft to traverse particular terrain, the range of change in the flight parameter being identified based on a plurality of values of the flight parameter.

2. The method of claim 1 wherein the second indicia represents a range of vertical speed to traverse the particular terrain.

3. The method of claim 2 wherein the first indicia comprises a warning alert.

4. The method of claim 2 wherein the first indicia comprises a caution alert.

5. The method of claim 1 wherein the second indicia represents a range of climb angle to traverse the particular terrain.

6. The method of claim 2 wherein the second indicia is provided on a vertical speed indicator display.

7. The method of claim 2 wherein the second indicia is provided on a vertical speed indicator capable of displaying traffic advisories.

8. The method of claim 1 wherein comparing one or more terrain avoidance profiles with terrain information is performed by a terrain and traffic collision avoidance processor.

9. The method of claim 1 wherein the second indicia comprises an audible message.

10. A computer program product for reducing a risk of controlled flight into terrain, the computer program product stored in a non-transitory tangible medium and comprising machine-readable code for:
    comparing, with a processor, a terrain avoidance profile with terrain information to determine with the processor whether a potential collision with terrain exists;
    generating, with one or more of a video output device and an audio output device, a terrain alert signal indicative of a terrain threat; and
    generating, with one or more of the video output device and the audio output device, a terrain avoidance signal indicative of a range of change in a flight parameter to traverse particular terrain, the range of change in the flight parameter being identified based on a plurality of values of the flight parameter.

11. The computer program product of claim 10 wherein the signal is further indicative of a range of thrust.

12. The method of claim 1 wherein comparing and communicating the second indicia are repeated to update the range during the traverse of the particular terrain.

13. The method of claim 1 wherein the second indicia represents a range of aircraft bearing.

14. The method of claim 1 wherein the second indicia represents a range of bank angle.

15. The method of claim 1 wherein the second indicia represents a range of thrust.

16. The method of claim 1 wherein the second indicia represents a range of at least one of vertical speed, climb angle, aircraft bearing, bank angle, and thrust as determined in accordance with a control operable by the pilot.

17. The method of claim 1 wherein the range comprises a minimum change in the flight parameter determined in accordance with a control operable by the pilot.

18. The computer program product of claim 10 wherein the range comprises a minimum change in the current flight determined in accordance with a provided control operable by the pilot.

19. The computer program product of claim 10 wherein the signal is further indicative of a range of at least one of vertical speed, climb angle, aircraft bearing, bank angle, and thrust as determined in accordance with a provided control operable by the pilot.

20. The computer program product of claim 10 wherein the terrain avoidance signal comprises indicia of a range of pull up rate.

21. The computer program product of claim 10 wherein the terrain avoidance signal comprises a range of vertical speeds.

22. The computer program product of claim 10 wherein the terrain avoidance signal comprises a range of climb angles.

23. The computer program product of claim 10 wherein the terrain avoidance signal comprises indicia of a range of aircraft bearing.

24. The computer program product of claim 10 further comprising machine- readable code for providing a traffic alert.

25. The computer program product of claim 20 wherein the indicia of range of pull up rate comprises an audible sound.

26. The computer program product of claim 10 wherein generating a terrain alert signal continues for a period of time and generating a terrain avoidance signal updates the range during the period.

27. The computer program product of claim 10 wherein the signal is further indicative of a range of bank angle.

* * * * *